United States Patent [19]

Waters

[11] Patent Number: 5,107,270
[45] Date of Patent: Apr. 21, 1992

[54] METHOD AND APPARATUS FOR INCREASING A RADAR'S RANGE WITH IMPROVED SCAN-TO-SCAN INTEGRATION OF DOPPLER FILTERED SIGNALS

[75] Inventor: William M. Waters, Millersville, Md.

[73] Assignee: The United States of America as represented by the Secretary of the Navy, Washington, D.C.

[21] Appl. No.: 541,991

[22] Filed: Jun. 22, 1990

[51] Int. Cl.⁵ .................. G01S 13/46; G01S 13/524
[52] U.S. Cl. .............................. 342/111; 342/115; 342/116
[58] Field of Search ............ 342/111, 116, 93, 115, 342/162, 195

[56] References Cited

U.S. PATENT DOCUMENTS

| | | | |
|---|---|---|---|
| 4,364,048 | 12/1982 | Waters et al. | 342/93 X |
| 4,550,318 | 10/1985 | Prengaman et al. | 342/195 |
| 4,556,887 | 12/1985 | Exeter | 342/115 |

Primary Examiner—Gilberto Barrón, Jr.
Attorney, Agent, or Firm—Thomas E. McDonnell; Edward F. Miles

[57] ABSTRACT

Method and apparatus for improving detection ranges of a pulsed radar system wherein electromagnetic return signal data in range cell order is doppler filtered, digitized and stored in doppler memory channels over multiple scans of an azimuth. The digital doppler data in each doppler memory channel is scan-to-scan integrated over a predetermined number of scans to produce target displays for each possible velocity. The target displays are stored in a velocity memory, which is partitioned into velocity channels, each velocity channel corresponding to one possible velocity. A selector selects the target display having the largest total magnitude as a display signal. The scan-to-scan integrated target displays are not subject to collapsing losses since only target signals plus noise signals will be stored in the doppler memory channel corresponding to the target's velocity.

8 Claims, 6 Drawing Sheets

5,107,270

METHOD AND APPARATUS FOR INCREASING A RADAR'S RANGE WITH IMPROVED SCAN-TO-SCAN INTEGRATION OF DOPPLER FILTERED SIGNALS

FIELD OF THE INVENTION

The present invention relates generally to an air surveillance radar system. More specifically, the present invention provides a method for increasing the signal-to-noise ratio (SNR), and thus the target detection range, by integrating electromagnetic return signals received on multiple consecutive scans of a radar antenna.

BACKGROUND OF THE INVENTION

A conventional air surveillance radar is range limited by the signal power of the electromagnetic return signals. Signal power S is proportional to the output power P of the radar transmitter and inversely proportional to the fourth power of the range R. From this relationship, $S \sim P/R^4$, it is evident that significant increases in power result in only marginal increases in effective range.

One way to increase radar performance is to collect radar return signals over several scans and manipulate the signals, such as by signal integration and threshold processing, to generate a composite target display. However, signal manipulations of this type are subject to collapsing losses. For example, simple superposition of range-azimuth cell data, e.g. on a plan-position, indicator (PPI), over consecutive scans fails due to collapsing losses since a target typically moves by more than one range-azimuth cell width during the scan interval. Integrating a number of received return signals X, containing target return signals and noise, with a number of return signals Y containing only noise results in distributing the signal power S over X+Y pulses. This results in only marginal increases, if any, in signal detectability.

Given initial target position and an a priori knowledge of the target's velocity, one can predict the range-azimuth cell the target was in the past or where it would be at any subsequent time. By summing signal plus noise in appropriate cells, one sums the echo signals coherently, increasing the aggregate signal to noise ratio.

Unfortunately, one rarely knows the trajectory of a target a priori. Thus to apply this integration principle, one's signal processing equipment would have to do sums corresponding to all likely target velocities. This would require an impractically large number of calculations and probably would not significantly improve the probability of detection. However, many targets of interest have velocities which are mostly radial with respect to the radar (i.e. have negligible or azimuthal components of velocity). Also many targets of interest have relatively constant speeds, especially over short periods of time. Examples of such targets would be a missile or aircraft homing on a surface ship which carries the radar. By doing these sums only for known values of radial velocities, the number of calculations is greatly reduced Each velocity v (or range increment $\Delta R$) corresponds uniquely to a doppler shift $f_v$ in the radar echoes. For k target velocities of interest $v_1, v_2, \ldots, v_k$, producing corresponding doppler shift increments $f_1, f_2, \ldots, f_k$, by doppler filtering the echoes can be segregated according to doppler frequency, i.e.:

Because the echoes are segregated according to doppler content, one need perform only one sum for each velocity of interest. This greatly reduces the computational requirements necessary to implement scan-to-scan integration, thereby permitting greater improvement in signal to noise ratio and greater probability of target detection.

SUMMARY OF THE INVENTION

Accordingly, the principle object of the present invention is to increase the effective range of an air surveillance radar system by providing improved scan-to-scan integration of return signal data which prevents collapsing losses.

Another object is to provide an improved radar system having an increased effective range by preventing collapsing loss during integration of doppler filtered return signals accumulated over multiple scanning periods. Doppler filtering is used to segregate return signals into doppler/velocity channels corresponding to doppler filter frequency and target velocity.

These and other objects and advantages are achieved in accordance with the present invention by utilizing velocity ambiguity information intrinsic in doppler filtered return signals to increase the efficiency of scan-to-scan integration and hence significantly improve the effective range of a radar system. In accordance with the present invention, simplifying assumptions are made to reduce the number of calculations needed to identify the presence of a target in range-azimuth $(R, \Theta)$ cell data stored in the form $M(R,\Theta,s,f)$ where s and f denote scan and doppler frequency values. First, the target is assumed to be approaching the radar system effectively on a single radial azimuth during the desired scan-to-scan integration interval, i.e. the target moves less than one beam width over the number of scans to be integrated, thereby making $\Theta$ a constant over that interval. The velocity of the target is further assumed to be relatively constant over the integration interval, and thus changes in velocity over the interval are small relative to the width of a doppler filter, and produces only small doppler shifts in the frequency information f. Doppler filtering of the electromagnetic return signal, hereinafter return signal, data thus segregates the return signal data according to possible or assumed velocities of the target. The data generated by each doppler filter is then separately scan-to-scan integrated, so that each integrated set of data contains either only noise data or target return signals plus noise data. The set of data having the largest total magnitude is then selected for preferential display as the target contained in the return signal data.

In accordance with the method and apparatus of the present invention, rf pulses of a predetermined frequency and width are transmitted along an azimuth during a plurality of scanning periods at predetermined intervals. Analog return signals, containing range, azimuth, and magnitude data, are received from at least one target located in a space scanned by an antenna, and converted to digital return signal data. The digital return signals are doppler filtered to produce digital doppler data, and the digital doppler data is stored in a first memory in a plurality of memory pages corresponding to velocity channels. The stored digital doppler data is then processed to produce sets of display data corresponding to target displays, which are stored in a second memory according to a possible velocity of the target. One of the stored target displays is then selected based on the total magnitudes of the display data; and a display signal is generated from the selected target display.

BRIEF DESCRIPTION OF THE DRAWINGS

These and other features and advantages of the present invention are disclosed in or apparent from the following detailed description of preferred embodiments. The preferred embodiments are described with reference to the drawings, in which like elements are identified throughout by like numbers and in which.

DESCRIPTION OF THE PREFERRED EMBODIMENTS

Figure 1:
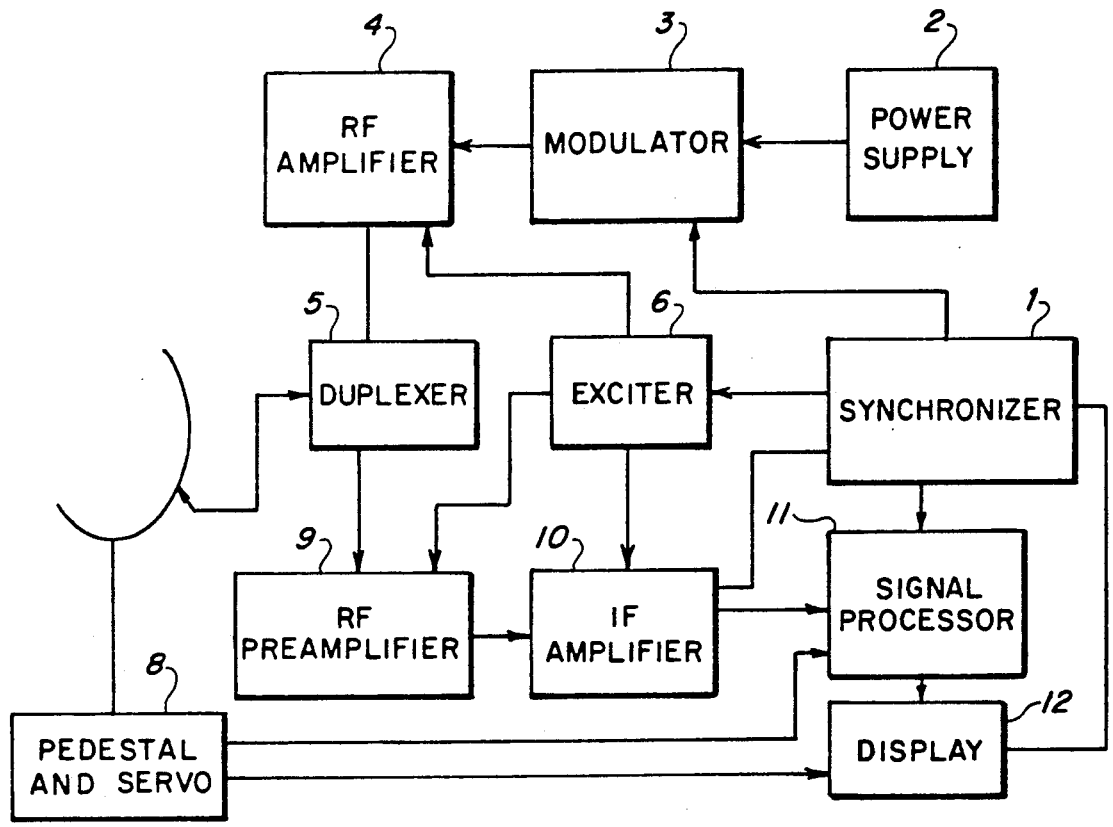
FIG. 1 is a block diagram of a typical pulsed radar system.

Referring to FIG. 1, a typical pulsed radar system comprises a synchronizer 1 for controlling the operation of the system. At scan start, synchronizer 1 signals a modulator 3 to apply a high voltage pulse from a power supply 2 to an rf amplifier 4. The rf amplifier 4 simultaneously receives a signal from an exciter 6. The resulting rf pulse is routed to a duplexer 5 which in turn routes the rf pulse to an antenna 7. Antenna 7 is rotated by a servo-driven pedestal 8.

After reflection from a target of interest, analog target return signals are received by antenna 7, along with return signals constituting noise only. The received return signals are routed by duplexer 5 to a receiver preamplifier 9. Exciter 6 supplies preamplifier 9 with a reference frequency which is used to step down the frequency of the analog return signals to an intermediate frequency. The output of preamplifier 9 is routed to an intermediate frequency (IF) amplifier 10. The output of IF amplifier 10 is passed to a signal processor 11, which is also supplied with antenna positional data from pedestal 8. After processing, processor 11 provides display signals for displaying target data on a display 12, which also utilizes antenna positional data from pedestal 8.

Figure 2:
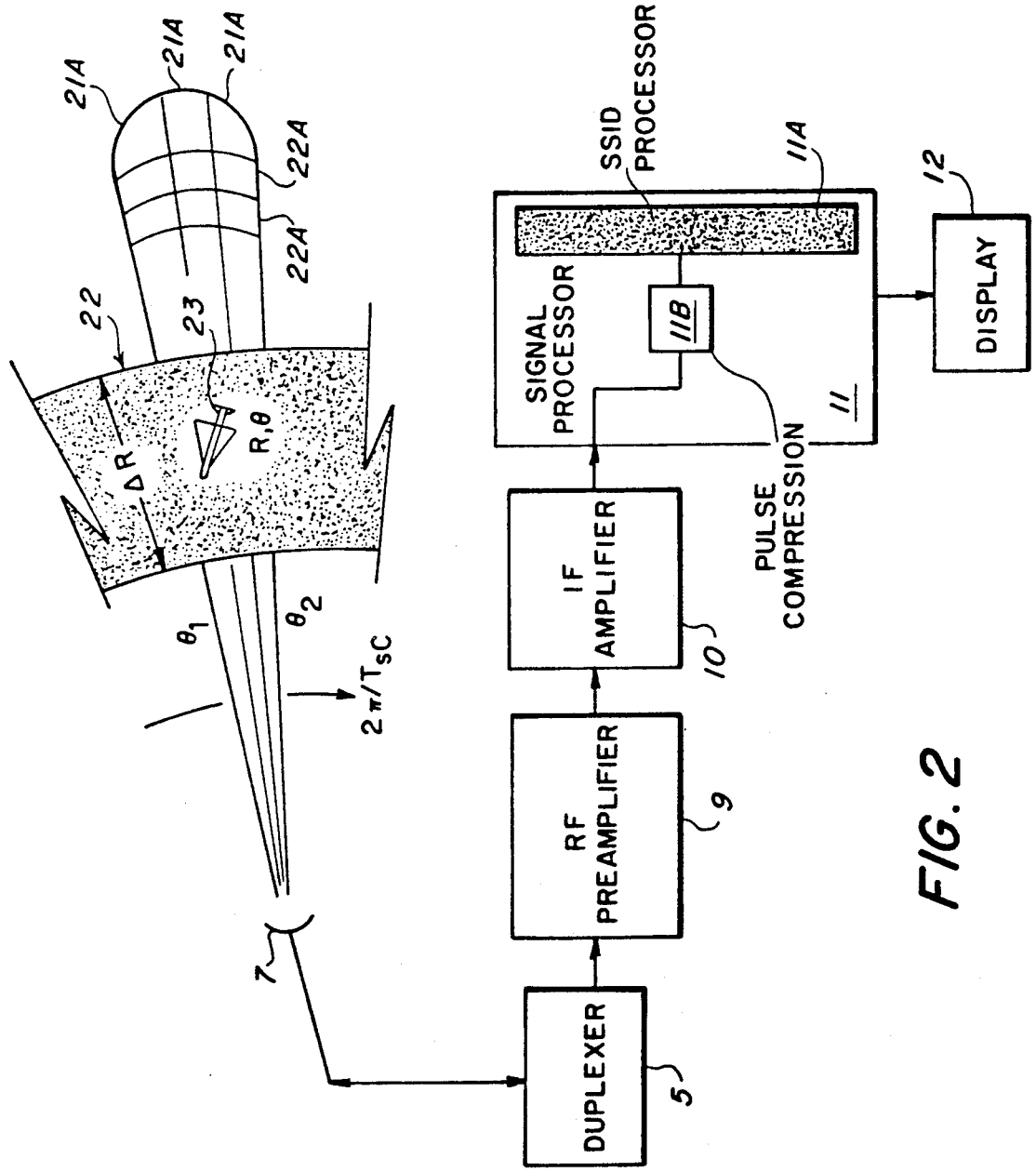
FIG. 2 is a block diagram of the receiver portion of a radar system incorporating a scan-to-scan integration of doppler filtered signals (SSID) processor in accordance with the present invention.

FIG. 2 shows a typical beam pattern 21 for an air surveillance radar system as the beam sweeps the angle from $\Theta_1$ to $\Theta_2$ at a rate of $2\pi/T_{sc}$, where $T_{sc}$ is the radar system scan time. The beam 21 is subdivided into multiple azimuth cells 21A. A guard band 22 is shown as the shaded area overlapping beam width 21, and is divided into range cells, e.g., 100 range cells numbered $R_1$ to $R_{100}$. That is, range cells $R_1$ to $R_{100}$, collectively, form guard band 22 with a minimum range of $R_1$ and a maximum range of $R_{100}$. For clarity, additional range cells 22A not associated with guard band 22 are shown. Target 23 is a radar-reflective object moving within guard band 22 at a range $R_i$, an azimuth $\Theta_j$ and some unknown velocity. The receiver portion of the radar system shown in FIG. 1 receives analog return signals from target 23 and processes the analog return signals as described in detail below.

Preferably, the pulse repetition frequency (prf) of the radar system of FIG. 1 is much greater than $T_{sc}$, allowing the radar system to generate multiple pulses as the beam angle sweeps between $\Theta_1$ to $\Theta_2$. Thus, the beam produces multiple azimuth increments as the beam moves by one beam width, each increment being referred to as an azimuth cell and represent by azimuth cell 21A in FIG. 2. Preferably, the sampling rate of the radar system is much faster than the prf, allowing the radar system to distinguish multiple return signals for each pulse generated by the system. Since return signals correspond to range R, each received return signal is associated and stored with reference to a range R, and identified with a range cell 22A. Thus, the magnitude M of each return signal can be stored in a range-azimuth cell formed from the intersection of one range cell 22A and one azimuth cell 21A which is further represented by $M(R_i, \Theta_j)$ when the range-azimuth cell falls within the guard band 22.

Figure 3:
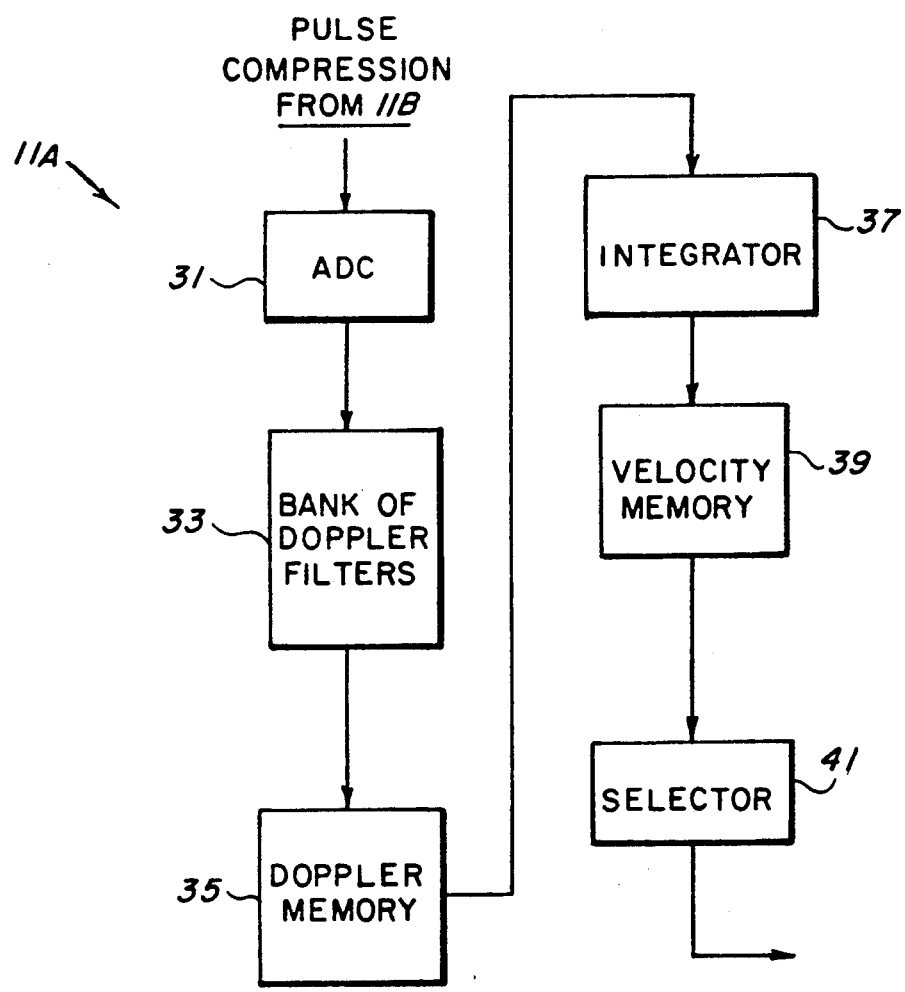
FIG. 3 is a diagrammatic block diagram showing the functional arrangement of a SSID processor according to the present invention for processing return signals.

Referring to FIGS. 2 and 3, in accordance with the present invention, processor 11 includes a processor 11A for scan-to-scan integration of doppler filtered signals (SSID).

In some radars, analog pulse compression is performed using electro-acoustic bulk or surface-wave devices (11b). For example, dispersive delay lines are used to compress (match-filter) linear "chirp" frequency modulated signal pulses.

Referring specifically to FIG. 3, processor 11A comprises analog-to-digital converter (ADC) circuitry 31, hereinafter ADC 31, which converts the analog return signal data to digital return signal data. ADC 31 is coupled to a bank of doppler filters 33 for processing the digital return signal data, which include magnitude and phase information for received return signals, to produce digital doppler data. Preferably, a bank of doppler filters 33 comprises a number, e.g., eight, of dedicated doppler filters $33_0$–$33_7$ covering a predetermined expected doppler frequency range. In addition, doppler filtering advantageously converts digital return signal data in complex form (i.e. having real and imaginary components) to digital doppler data. For example, eight doppler filters $33_k$, where $0 \leq k \leq 7$, each with a band width of 100 Hertz (Hz), advantageously are used to process doppler frequencies in the range of 0–800 Hz. For clarity, a doppler frequency range will hereinafter be denoted by the center frequency of the doppler frequency range corresponding to one doppler filter $33_k$, e.g., the frequency range of a doppler filter $33_k$ having a center frequency of 100 Hz will be denoted as a doppler frequency of 100 Hz.

The digital doppler data produced by ADC 31 and the bank of doppler filters 33 are stored in a doppler memory 35. Doppler memory 35 is configured or partitioned to store all digital doppler data from the $k^{th}$ doppler filter $33_k$ in an associated doppler memory channel $35_k$, where $0 \leq k \leq 7$. Each of the doppler memory channels $35_k$ is further sub-divided into a plurality of N, e.g., three, doppler memory pages $35_{ks}$, where $0 \leq s \leq (N-1)$ and s is the number of one of the scans. One doppler memory page $35_{ks}$, therefore, stores digital doppler data collected during one scan s and generated by the $k^{th}$ doppler filter $33_k$. Preferably, the digital doppler data stored in doppler memory 35 consists of return signal magnitude data M for each range-azimuth cell $R_i$, $\Theta_j$.

After a predetermined number of scans have occurred, e.g., three, and the associated digital doppler data has been stored in doppler memory 35, doppler memory 35 is accessed by an integrator 37. Integrator 37 sums the data stored in each of the pages $35_{ks}$, by the method discussed in detail below, and writes the output to a velocity memory 39. Preferably, velocity memory 39 is partitioned into a plurality of velocity channels 39a, each of which corresponds to a particular velocity of target 23, selected as described below. Velocity channel selector 41 samples each velocity channel 39a, and outputs the contents of the velocity channel 39a having the greatest total signal magnitude to display 12 of FIG. 2.

Figure 4:
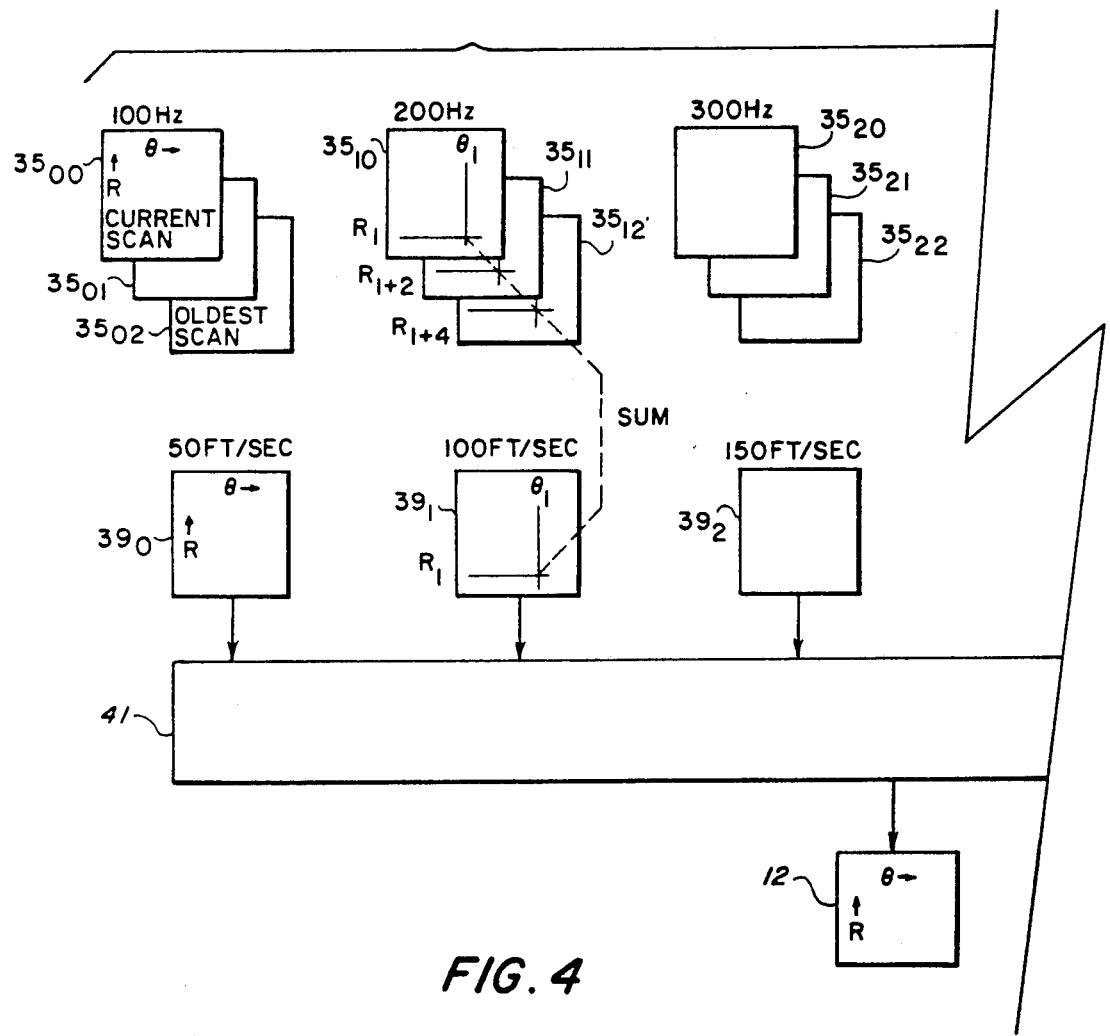
FIG. 4 diagrammatically illustrates an exemplary transformation of digital return signal data from doppler memory channel data to velocity channel data in accordance with the present invention.

In FIG. 4, an illustrative case is shown in which, for clarity, doppler filter frequencies of 100 Hz, 200 Hz and 300 Hz correspond to three of the possible target velocities of 50 ft./sec., 100 ft./sec. and 150 ft./sec., respectively. Three doppler memory channels $35_k$, where k=1, 2 and 3, each containing three pages $35_{ks}$, where s=0, 1 and 2, are shown to illustrate the operation of SSID processor 11A. Digital doppler data produced by ADC 31 and the bank of tree doppler filters $33_k$ are stored in the three doppler memory channels $35_k$, respectively, in which three doppler memory pages $35_{ks}$ of data, corresponding to three scans, are stored. Thus, digital doppler data from three doppler filters $33_1$-$33_3$, Hz, respectively, are stored in doppler memory channels $35_1$-$35_3$. During one scan s, digital doppler data associated with doppler filter 331 will be stored in doppler memory channel $35_1$ and doppler memory page $35_{10}$.

To determine if a target 23 of FIG. 2, having a velocity of 100 ft./sec. is present, integrator 37 samples the 200 Hz. doppler memory channel $35_1$ to integrate a target display from digital doppler data stored over the three scans. Given an initial range $R_i$ and an initial azimuth $\Theta_j$, the magnitudes of digital doppler data at range $R_i$ for the current scan, $R_{i+2}$ for the previous scan and $R_{i+4}$ for the oldest scan are summed from doppler memory pages $35_{10}$, $35_{11}$ and $35_{12}$, respectively; and the result is output to the $M(R_i,\Theta_j)$ range-azimuth cell in velocity channel 39 corresponding to 100 ft./sec. The process is repeated as $R_i$ is incremented by 1 from $R_1$ to $R_{100}$ for the same $\Theta_j$, and then $\Theta_j$ is incremented by 1 and the process repeats. Thus, a target display is integrated by SSID processing and stored in velocity channel $39_2$.

The doppler frequency $f_k$ of each doppler filter $33_k$ corresponds to both the radial velocity of target 23 with respect to the radar system shown in FIG. 1 and the operating characteristics of that radar system, as discussed in detail below. Target 23 can be moving at a number of different velocities and still produce digital doppler data in the $k^{th}$ doppler filter $33_k$ of the bank of doppler filters 33. For example, given a doppler frequency range of 800 Hz, targets with a radial velocity V, and producing a doppler frequency of $f_k$ Hz, will be stored in the $k^{th}$ doppler memory channel $35_k$ associated with $f_k$ Hz. Velocities having doppler frequencies of $f_k+800$ Hz, $f_k+1600$ Hz and $f_k+2400$ Hz, respectively, can all be stored in the $k^{th}$ doppler memory channel $35_k$ corresponding to the frequency $f_k$ Hz. Hence, the velocity associated with the doppler data produced by a doppler filter $33_k$ and stored in a doppler memory channel $35_k$ is ambiguous.

The digital doppler data stored in each page $35_{ks}$ can, therefore, be used several times during SSID processing by integrator 37 to integrate target displays at each possible velocity. Preferably, the SSID processing described above is repeated for target 23 at each possible velocity so that a target display is stored in a corresponding velocity channel 39a for each possible velocity. After all targets displays for all possible velocities are stored in velocity channels 39a, selector 41 examines each velocity channel 39a and outputs to display 12 one selected velocity channel 39a having the greatest total magnitude of SSID processed digital doppler data.

Referring to FIG. 3, received analog return signal data in complex form is converted to complex digital signal data by ADC 31, is processed in the bank of doppler filters 33 and their magnitudes are stored in doppler memory 35. After each transmitted pulse, a predetermined number of range samples, e.g., 100, are taken so that a fast approaching target will remain in the beam pattern for the number of antenna scans over which integration will take place. The digital doppler data is stored in doppler memory 35 as $M(R_i,\Theta_j,0,f_k)$, $M(R_i,\Theta_j,1,f_k)$ and $M(R_i,\Theta_j,2, f_k)$ for the oldest, the previous and the current scan, respectively. The doppler filter frequency $f_k=kf_r/8$, where $0 \leq k \leq 7$ and $f_r$ is the pulse repetition frequency of the radar system shown in FIG. 1. Thus, each doppler filter frequency $f_k$ is an integer multiple of the pulse repetition frequency divided by the number of doppler filters.

For each value of $f_k$ there corresponds a velocity, $V_k$. The velocity increment, $\Delta V_k$, is $\lambda(f_r/8)/2$ or $\lambda f_r/16$, where $\lambda$ is the radar wavelength. Thus, digital doppler data from a target with a velocity of $V_k=\lambda(f_k+nf_r)/2$, where n is an integer, appears in the kth doppler memory channel $35_k$ of doppler memory 35. Moving target digital doppler data in one scan can be added to moving target digital doppler data in another scan by integrator 37 using the following equation:

$$M(V_k,R_i,\Theta_j) = M(R_i+2\Delta R_k,\Theta_j,0,f_k) + M(R_i+\Delta R_k,\Theta_j,1,f_k) + M(R_i,\Theta_j,2,f_k) \quad (1)$$

(for a three scan integration process) where:

$$\Delta R_k = \Delta V_k T_{sc}$$
= distance traveled between the scans with a velocity corresponding to the $kth$ doppler filter.

For target velocities greater than $\Delta V_7$ and less than $\Delta V_{16}$, scan-to-scan integration is performed by integrator 37 using the following equation:

$$M(V_{k+8},R_i,\Theta_j) = M(R_i+2\Delta R_{k+8},\Theta_j,0,f_k) + M(R_i+\Delta R_{k+8},\Theta_j,1,f_k) + M(R_i,\Theta_j,2,f_k) \quad (2)$$

Similar equations can be written for higher order velocity ambiguities.

Limiting integration to targets having a fixed velocity and moving along a single azimuth reduces the number of calculations performed by processor 11A. In addition, by performing SSID processing on digital doppler data, the resultant value contains only return signals containing noise or only return signals containing target signals plus noise, thus preventing collapsing losses.

Referring again to FIG. 1, a second illustrative case will be discussed for a radar system having different physical parameters from the illustrative case discussed above, to demonstrate the effectiveness of SSID processing for any air search radar system. In the second illustrative case, a radar system has parameters including: a scan time ($T_{sc}$) of 4 seconds; a pulse repetition interval (Tr) of 1000 μs; a wavelength (λ) of 1.0 ft.; and a beam dwell time (Tdw) of 31.3 ms. Preferably, since Tdw is much greater than Tr, multiple return signals for each range cell $R_i$ will be collected in the signal processor 11 of FIG. 1. The number k of doppler filters $33_k$, implemented in the bank of doppler filters 33, is 16. The beam width of the radar is approximately 3°, which equates to a width of approximately 3 nautical miles (nmi.) at a range of 60 nmi. Therefore, an exemplary target 23 having a velocity of Mach 2.0, all in a tangential direction, and a range of 240 nmi, would move less than one beam width during 8 scans, i.e., 32 sec.

In view of the foregoing, two assumptions can be made. Target angle $\Theta_j$ can be assumed to be constant over a 32 sec. integration interval. In addition, the target velocity can be assumed to be constant, or to change significantly less than 33.25 ft./sec., the velocity $V_k$ corresponding to the width of one doppler filter $33_k$ for a radar system with the parameters given above.

Given the assumptions above, scan-to-scan integration can be performed by integrator 37, without collapsing loss, by coherently batch processing complex samples $M(R_1,\Theta_j, p)$, where $M(R_1,\Theta_j, p)$ represents the return signal data produced for each pulse p while antenna 7 of FIG. 1 moves from $\Theta_1$ to $\Theta_2$ during 16 pulses of the jth batch for the ith range sample. This produces $M(R_i,\Theta_j,f_k)$ for $0 \leq k \leq 15$, where $M(R_i,\Theta_j, f_k)$ are the digital doppler data stored in doppler memory 35, which are integrated with values obtained and stored from earlier scans and which are stored for integration with digital doppler data from subsequent scans, denoted by $M(R_i,\Theta_j,s,f_k)$.

If the value $M(R_i,\Theta_j,0,f_k)$ is from the current scan, values from the seven previous scans are $M(R_i,\Theta_j,1,f_k)$, $M(R_i,\Theta_j,2,f_k)$, . . ., $M(R_i,\Theta_j,7,f_k)$, respectively. Scan-to-scan integration for each doppler filter and corresponding velocity channel $MV_k$ is accomplished for range-azimuth cell $R_i,\Theta_j$ as follows:

$$k = 0, \quad MV_0 = \Sigma_0^7 \; M(R_i,\Theta_j,s,f_k)$$

$$k = 1, \quad MV_1 = \Sigma_0^7 \; M(R_{[i-Int(s\Delta V_k T_{sc}/\Delta Rk)]},\Theta_j,s,f_k)$$

$$k = 2, \quad MV_2 = \Sigma_0^7 \; M(R_{[i-Int(2s\Delta V_k T_{sc}/\Delta Rk)]},\Theta_j,s,f_k)$$

. . .

$$k = 15, \quad MV_{15} = \Sigma_0^7 \; M(R_{[i-Int(15s\Delta V_k T_{sc}/\Delta Rk)]},\Theta_j,s,f_k)$$

where $\Delta V_k$ and $\Delta R_k$ are velocity and range increments associated with doppler frequency $f_k$ and range cells $R_i$, respectively.

Since the $\Sigma M(R_i,\Theta_j,f_k)$ values are due to a sum containing only noise signals or due to a sum containing target signals plus noise signals, the above procedure avoids collapsing losses. SNR is improved (over the single scan value at the doppler filter output) by 9 dB less 1.5 to 2.0 dB integration loss, depending on the detection and false alarm probabilities of the radar system of FIG. 1. Target detection range is increased by a factor greater than 1.49.

Figure 5:
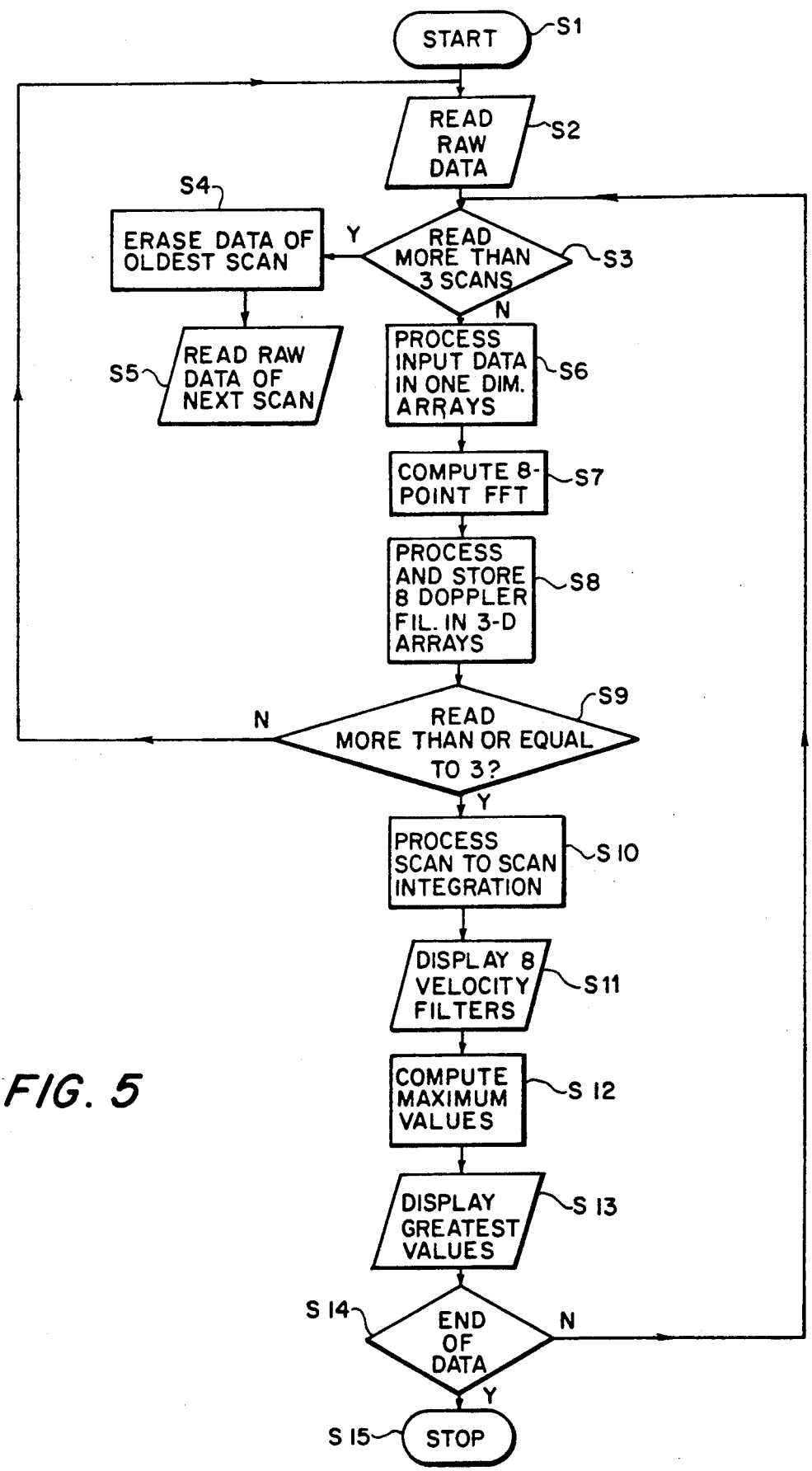
FIG. 5 is a flowchart illustrating the overall sequence of operations of a preferred method according to the present invention for processing received return signals to generate target displays.

Referring to FIG. 5, the overall sequence of signal processing in accordance with the present invention will be summarized. It will be appreciated that the signal processing can be implemented by a hardwired processor 11A, or by programming incorporated into a conventional digital computer-based signal processor 11. At step S1, SSID processing starts with the initialization of all memory locations. At step S2, return signal data from the latest scan is read in or received by the SSID processor after which, at step S3, a check is made to determine if return signal data for more than a predetermined number of scans, e.g., three, is currently stored. If more than three scans of return signal data are stored, the program executes step S4 and erases return signal data for the oldest scan, and then executes step S5 to read in data from the latest scan. The program then executes step S6. If three or less scans of return signal data are sensed in step S3, the program executes step S6 directly.

During step S6, return signal data in the form $M(R,\Theta,f)$ is read in the sequence received. The data is then doppler filtered in step S7. The doppler filtered return signal data (doppler data) is and stored in a 3 dimensional memory array, corresponding to doppler memory $35_{ks}$. At step S9, a check is made to determine if at least three scans worth of doppler data are stored in the 3 dimensional array for further processing. If less than three scans are present, the program returns to step S2 to receive additional data. If three or more scans of doppler data are present, SSID processing is executed in step S10 and the results stored in velocity filter channels (velocity channels) at step S11.

At step S12, each of the velocity channels stored in step S11 are read and the stored SSID processed doppler data is totaled. The velocity channel with the greatest total magnitude is selected in step S12 and displayed in step S13.

At step S14, the program checks to see if additional return signal data from another scan is available. If additional return signal data is available, the program returns to step S3, and repeats SSID processing. If additional return signal data from another scan is not available, program execution ends at step S16.

Figures 6A, 6B, 6C:
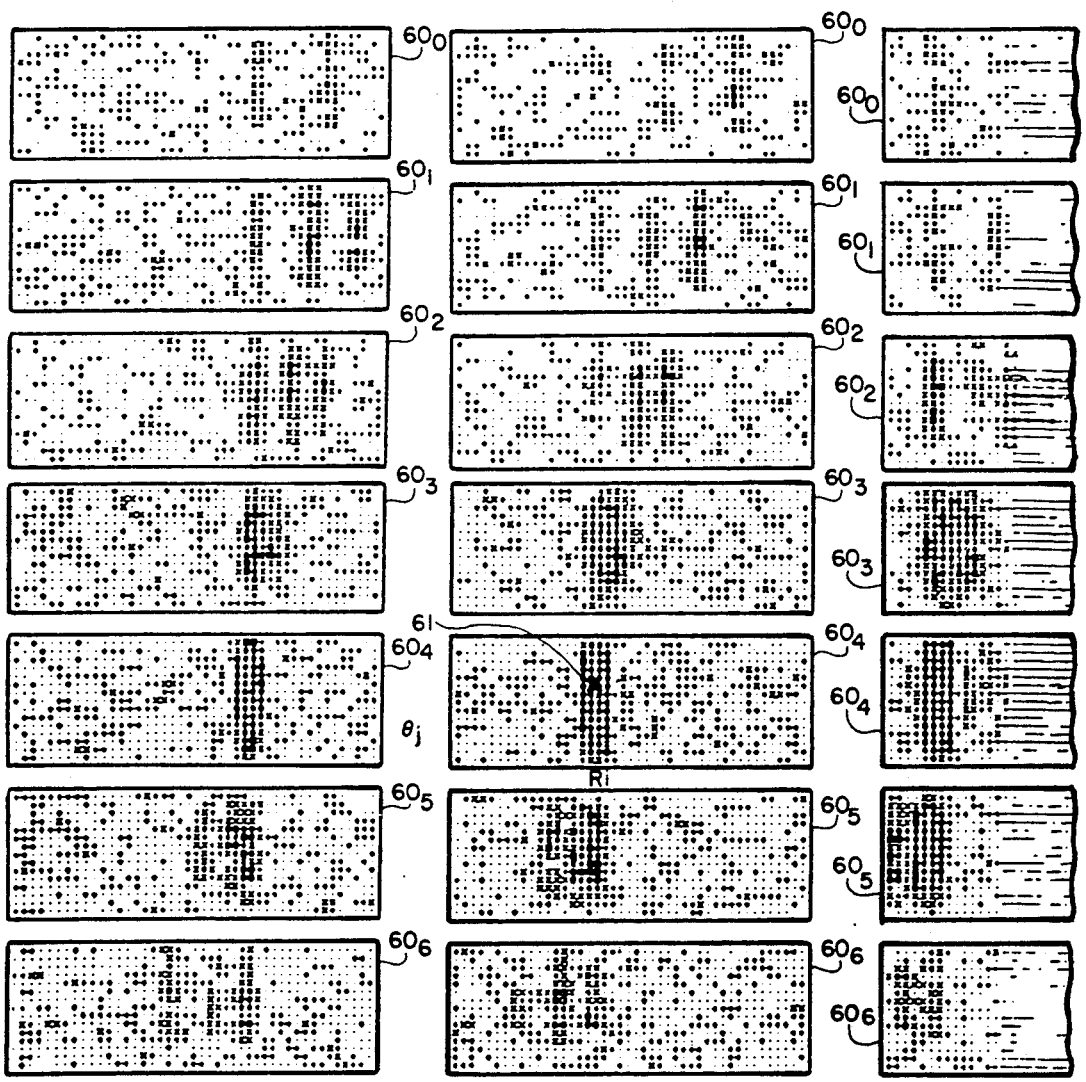
FIGS. 6A–6C depict a series of radar display screens showing the effect of SSID processing in accordance with the present invention on actual target data.

FIGS. 6A, B and C show $\Sigma M(R_i,\Theta_j,f_k)$ values producing enhanced target displays 60 for three consecutive scans 1-3, 2-4 and 3-5, respectively, for a bank of seven doppler filters 33. Each of the enhanced target displays 60 shown in FIGS. 6 A, B and C represents the data stored in one of the velocity channels 39a of FIG. 4. For example, display $60_0$ of FIG. 6A represents the data generated by doppler filter $33_0$ and stored in doppler memory pages $35_{01}$, $35_{02}$ and $35_{03}$. In display 60 azimuth angle Θ increases moving up the display, and range R increases moving left to right across the display. Each point in display $60_0$ of FIG. 6A thus represents one value $\Sigma M(R_i,\Theta_j,f_k)$. The symbols used in depicting each point in the target displays of FIGS. 6A, B and C are selected to represent nine possible magnitudes of $\Sigma M(R_i,\Theta_j,f_k)$ between low (no symbol) and high (large black dot). FIGS. 6A, B and C each contain seven displays representing $V_0$ to $V_6$, corresponding to doppler filters $33_0$ to $33_6$, respectively, reading top to bottom along each column.

FIGS. 6A, B and C were produced using experimental data from an actual radar system and clearly demonstrate return signal enhancement using the SSID processing. FIGS. 6A, B and C each show a maximum response in the display $60_4$ for fifth row from the top, which corresponds to doppler filter $33_4$ and therefore to $V_4$. From the display $60_4$ in FIG. 6B, for example, the concentration of large black dots producing a heavily shaded region 61 represents a target having a velocity of $V_4$ located along an azimuth $\Theta_j$ at a range $R_i$. This accurately reflects the motion of an actual target used in collecting the return signals, processed in accordance with the flowchart shown in FIG. 5, traveling at 120 knots monitored by a radar system with a wavelength of 0.78 ft and $f_r = 833$ pps.

Other modifications and variations to the invention will be apparent to those skilled in the art from the foregoing disclosure and teachings. Thus, while only certain embodiments of the invention have been specifically described herein, is will be apparent that numerous modifications may be made thereto without departing from the spirit and scope of the invention.

What is claimed is:

1. A method for increasing the detection range of a pulsed radar system having a transmitter operating at a predetermined rf pulse frequency, a corresponding predetermined wavelength and a predetermined pulse repetition frequency, and having an antenna, the method comprising the steps of:

receiving analog return signal data having range, azimuth and magnitude information over a predetermined number of scans from at least one target located in a space scanned by the antenna;

converting said analog return signal data to digital return signal data;

processing said digital return signal data using a plurality of doppler filters each having a different doppler frequency to produce digital doppler data;

storing said digital doppler data in a doppler memory wherein said doppler memory is partitioned into a plurality of doppler memory channels and each of said doppler memory channels is partitioned into a plurality of pages, wherein said digital doppler data is stored in one of said doppler memory channels corresponding to one of said doppler frequencies and is further stored in one of said pages corresponding to one of said scans;

calculating a plurality of target displays by SSID processing said digital doppler data, wherein each of said target displays corresponds to one of said doppler memory channels and uses digital doppler data stored in corresponding said pages;

storing said target displays in a velocity memory, wherein said velocity memory is partitioned into a plurality of velocity channels, each of said velocity channels corresponding to a possible velocity;

selecting the one of said stored target displays having the greatest total magnitude;

displaying said selected stored target display; and wherein the step of calculating the target display further comprises the steps of:

calculating a velocity for said at least one target for each of said different doppler frequencies, each said velocity corresponding to one of said different doppler frequencies:

calculating a distance traveled by said target at each said velocity during an interval corresponding to the pulse repetition frequency by multiplying said velocity by said interval;

calculating said magnitude for each of said target displays based on said distance travelled and said digital doppler data stored in said doppler memory channel corresponding to each of said doppler frequencies.

2. The method of claim 1 wherein the step of calculating said velocity further comprises the step of calculating a velocity increment based on said predetermined wavelength and said predetermined pulse repetition frequency.

3. A method for increasing the detection range of a pulsed radar system having a transmitter operating at a predetermined rf pulse frequency, a corresponding predetermined wavelength and a predetermined pulse repetition frequency, and having an antenna, the method comprising the steps of:

receiving analog return signal data having range, azimuth and magnitude information over a predetermined number of scans from at least one target located in a space scanned by the antenna;

converting said analog return signal data to digital return signal data;

processing said digital return signal data using a plurality of doppler filters each having a different doppler frequency to produce digital doppler data;

storing said digital doppler data in a doppler memory wherein said doppler memory is partitioned into a plurality of doppler memory channels and each of said doppler memory channels is partitioned into a plurality of pages, wherein said digital doppler data is stored in one of said doppler memory channels corresponding to one of said doppler frequencies and is further stored in one of said pages corresponding to one of said scans;

calculating a plurality of target displays by SSID processing said digital doppler data, wherein each of said target displays corresponds to one of said doppler memory channels and uses digital doppler data stored in corresponding said pages;

storing said target displays in a velocity memory, wherein said velocity memory is partitioned into a plurality of velocity channels, each of said velocity channels corresponding to a possible velocity;

selecting the one of said stored target displays having the greatest total magnitude;

displaying said selected stored target display; and wherein the step of calculating said target display further comprises the steps of:

calculating a velocity for each of said different doppler frequencies, wherein said velocity corresponds to one of said different doppler frequencies and said velocity is calculated using said predetermined pulse repetition rate and said predetermined wavelength;

calculating a distance traveled for each said velocity during an interval based on said pulse repetition frequency by multiplying said velocity by said interval; and calculating said magnitude for each of said target displays based on said distance travelled and said digital doppler data stored in said doppler memory channel corresponding to each of said different doppler frequencies.

4. A pulsed radar system with increased range detection, the apparatus comprising:

means for scanning along an azimuth, said means for scanning comprises means for transmitting an rf pulse of a predetermined frequency and width at a plurality of predetermined intervals along said azimuth, through an antenna;

means for receiving return signal data for a plurality of range cells along said azimuth from at least one target located in a space scanned by said antenna;

means for converting said analog return signal data to digital return signal data;

means for filtering said digital return signal data using a plurality of doppler filters each having a different doppler frequency to produce digital doppler data;

means for storing said digital doppler data in a doppler memory wherein said doppler memory stores said digital doppler data in a plurality of doppler memory channels corresponding to one of said different doppler frequencies, said doppler memory channels being partitioned into a plurality of doppler memory pages each of said pages corresponding to one of said plurality of rf pulses;

means for calculating a plurality of target displays by SSID processing said digital doppler data stored in each of said pages;

means for storing said target displays in a velocity memory, said velocity memory being partitioned into a plurality of velocity channels, each of said velocity channels corresponding to a possible velocity;

means for selecting the one of said plurality of stored target displays having the greatest total magnitude;

means for displaying said selected stored target display; and said apparatus further comprising:

means for calculating a velocity for each of said different doppler frequencies, each said velocity corresponding to one of said different doppler frequencies;

means for calculating a distance traveled for each said velocity during said predetermined interval by multiplying said velocity by said predetermined interval; and means for calculating said magnitude for each of said velocity channels based on said distance travelled and said digital doppler data stored in one of said doppler memory channels.

5. The apparatus of claim 4 wherein said means for calculating a velocity increment calculates said velocity increment based on said each of said different doppler frequencies and said predetermined intervals.

6. A pulsed radar system with increased range detection, the apparatus comprising:

means for scanning along an azimuth, said means for scanning comprises means for transmitting an rf pulse of a predetermined frequency and width at a plurality of predetermined intervals along said azimuth, through an antenna;

means for receiving return signal data for a plurality of range cells along said azimuth from at least one target located in a space scanned by said antenna;

means for converting said analog return signal data to digital return signal data;

means for filtering said digital return signal data using a plurality of doppler filters each having a different doppler frequency to produce digital doppler data;

means for storing said digital doppler data in a doppler memory wherein said doppler memory stores said digital doppler data in a plurality of doppler memory channels corresponding to one of said different doppler frequencies, said doppler memory channels being partitioned into a plurality of doppler memory pages each of said pages corresponding to one of said plurality of rf pulses;

means for calculating a plurality of target displays by SSID processing said digital doppler data stored in each of said pages;

means for storing said target displays in a velocity memory, said velocity memory being partitioned into a plurality of velocity channels, each of said velocity channels corresponding to a possible velocity;

means for selecting the one of said plurality of stored target displays having the greatest total magnitude; and means for displaying said selected stored target display; and said apparatus further comprising:

means for calculating a plurality of velocities, each one of said plurality of velocities corresponding to a respective one of said different doppler frequencies, wherein each of said plurality of velocities is calculated using said predetermined pulse intervals and said respective one of said different doppler frequencies;

means for calculating a distance traveled for said each one of said plurality of velocities during said predetermined interval by multiplying said each one of said plurality of velocities by said predetermined intervals; and means for calculating said magnitude for said each one of said plurality of velocities based on said distance travelled and said digital doppler data stored in said pages corresponding to to said respective one of said different doppler frequencies.

7. A pulsed radar system with increased range detection having a transmitter for transmitting a plurality of pulses at a predetermined pulse repetition rate and a receiver for receiving analog return signal data having range, azimuth and magnitude information over a plurality of scans, comprising:

an analog-to-digital converter producing digital return signal data;

a plurality of doppler filters coupled to said analog-to-digital converter each having a different doppler frequency for doppler filtering said digital return signal data to produce digital doppler data;

a doppler memory coupled to said doppler filters and partitioned into a plurality of doppler memory channels each of said doppler memory channels corresponding to one of said different doppler frequencies and further partitioned into a plurality of doppler memory pages, each of said pages corresponding to one of said scans;

an integrator coupled to said doppler memory for SSID processing said digital doppler data stored in said pages of said doppler memory channels to produce a plurality of target displays;

a velocity memory coupled to said integrator for storing said target displays;

a selector for selecting the one of said stored target displays having the greatest total magnitude, said selector generating a display signal corresponding to said one selected stored target display;

a display coupled to said selector and receiving said display signal and;

wherein said integrator further comprises:

first calculation means for calculating a plurality of velocities based on said different doppler frequencies;

second calculation means for calculating a plurality of distances traveled at each of said velocities: and integrating means for integrating said digital doppler data stored in each of said pages in said doppler memory channel corresponding to one of said different doppler frequencies.

8. A pulsed radar system with increased range detection having a transmitter for transmitting a plurality of pulses at a predetermined pulse repetition rate and a receiver for receiving analog return signal data over a plurality of scans, said data being in the form $M(R_i, \Theta_j, n)$, where M represents the magnitude of said return signal from the ith range cell R in the jth azimuthal direction $\Theta$, from the nth scan, $n = 1, 2, \ldots, N$, said system comprising:

an analog-to-digital converter producing digital return signal data;

a plurality of doppler filters coupled to said analog-to-digital converter each having a different doppler frequency $f_k$, $k = 1, 2, \ldots, K$, for doppler filtering said digital return signal data to produce digital doppler data, said digital doppler data being in the form $M(R_i, \Theta_j, n, f_k)$;

a doppler memory coupled to said doppler filters and partitioned into a plurality of doppler memory channels each of said doppler memory channels corresponding to one of said different doppler frequencies $f_k$ and further partitioned into a plurality of doppler memory pages, each of said pages corresponding to one of the N scans;

an integrator coupled to said doppler memory for SSID processing said digital doppler data stored in said pages of said doppler memory channels to produce a plurality of target displays;

a velocity memory coupled to said integrator for storing said target displays;

a selector for selecting the one of said stored target displays having the greatest total magnitude, said selector generating a display signal corresponding to said one selected stored target display;

a display coupled to said selector and receiving said display signal, and wherein said integrator calculates said target displays after accumulating digital doppler data for N scans using:

$[M(V_k, R_i, \Theta_j)]$ Target Display for range cell $R_i$, azimuthal direction $\Theta_j$, and doppler frequency $f_k = M(R_i + (N-1)\Delta R_k, \Theta_j, 0, f_k) + M(R_i + (N-2)\Delta R_k, \Theta_j, 1, f_k) + \ldots + M(R_i, \Theta_j, (N-1), f_k) = \Sigma_{n=1} M(R_i + n\Delta R_k, \Theta_j, f_k)$ where:

$\Delta R_k$ is distance traveled between each of said scans with a velocity corresponding to the kth doppler filter.

* * * * *